US012713433B2

(12) United States Patent
Kim et al.

(10) Patent No.: US 12,713,433 B2
(45) Date of Patent: Aug. 18, 2026

(54) METHOD AND DEVICE FOR TRANSMITTING OR RECEIVING UPLINK OR DOWNLINK IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 18/557,797

(22) PCT Filed: May 3, 2022

(86) PCT No.: PCT/KR2022/006351

§ 371 (c)(1),
(2) Date: Oct. 27, 2023

(87) PCT Pub. No.: WO2022/240059

PCT Pub. Date: Nov. 17, 2022

(65) Prior Publication Data

US 2024/0373425 A1 Nov. 7, 2024

(30) Foreign Application Priority Data

May 11, 2021 (KR) ........................ 10-2021-0060881

(51) Int. Cl.
*H04W 4/00* (2018.01)
*H04B 7/024* (2017.01)
(Continued)

(52) U.S. Cl.
CPC ............ *H04W 72/20* (2023.01); *H04B 7/024* (2013.01); *H04W 72/51* (2023.01)

(58) Field of Classification Search
None
See application file for complete search history.

(56) References Cited

U.S. PATENT DOCUMENTS

2015/0319771 A1 11/2015 Hill et al.
2021/0143869 A1* 5/2021 Khoshnevisan .. H04W 72/0446
2022/0201669 A1* 6/2022 Yuan .................. H04W 72/046

FOREIGN PATENT DOCUMENTS

WO WO-2019069132 A1 * 4/2019 ........... H04B 7/0426
WO WO 2020/224578 11/2020
WO WO 2021/029753 2/2021

OTHER PUBLICATIONS

CATT, "Discussions on enhancements on multi-beam operation," 3GPP TSG RAN WG1 #104b-e, R1-2102598, e-Meeting, Apr. 12-20, 2021, 17 pages.

(Continued)

*Primary Examiner* — Zewdu A Beyen
(74) *Attorney, Agent, or Firm* — Fish & Richardson P.C.

(57) ABSTRACT

Disclosed are a method and device for transmitting or receiving an uplink or downlink in a wireless communication system. A method for a terminal to communicate according to an embodiment disclosed herein may comprise the steps of: transmitting capability information including first information to a base station, wherein the first information indicates whether the terminal supports a single transmission or reception configuration in a single unit of time, or supports multiple transmission or reception configurations in a single unit of time; receiving, from the base station, second information related to at least one transmission occasion (TO) based on the capability information; and performing uplink transmission or downlink reception in the at least one TO on the basis of the second information.

9 Claims, 10 Drawing Sheets

(51) Int. Cl.
*H04W 72/20* (2023.01)
*H04W 72/51* (2023.01)

(56) References Cited

OTHER PUBLICATIONS

International Search Report and Written Opinion in International Appln. No. PCT/KR2022/006351, mailed on Aug. 17, 2022, 6 pages (with English translation).
Moderator (Samsung), "Moderator summary#5 for multi-beam enhancement: Round 4," 3GPP TSG RAN WG1 #104b-e, R1-2103953, e-Meeting, Apr. 12-20, 2021, 23 pages.

* cited by examiner

FIG.6

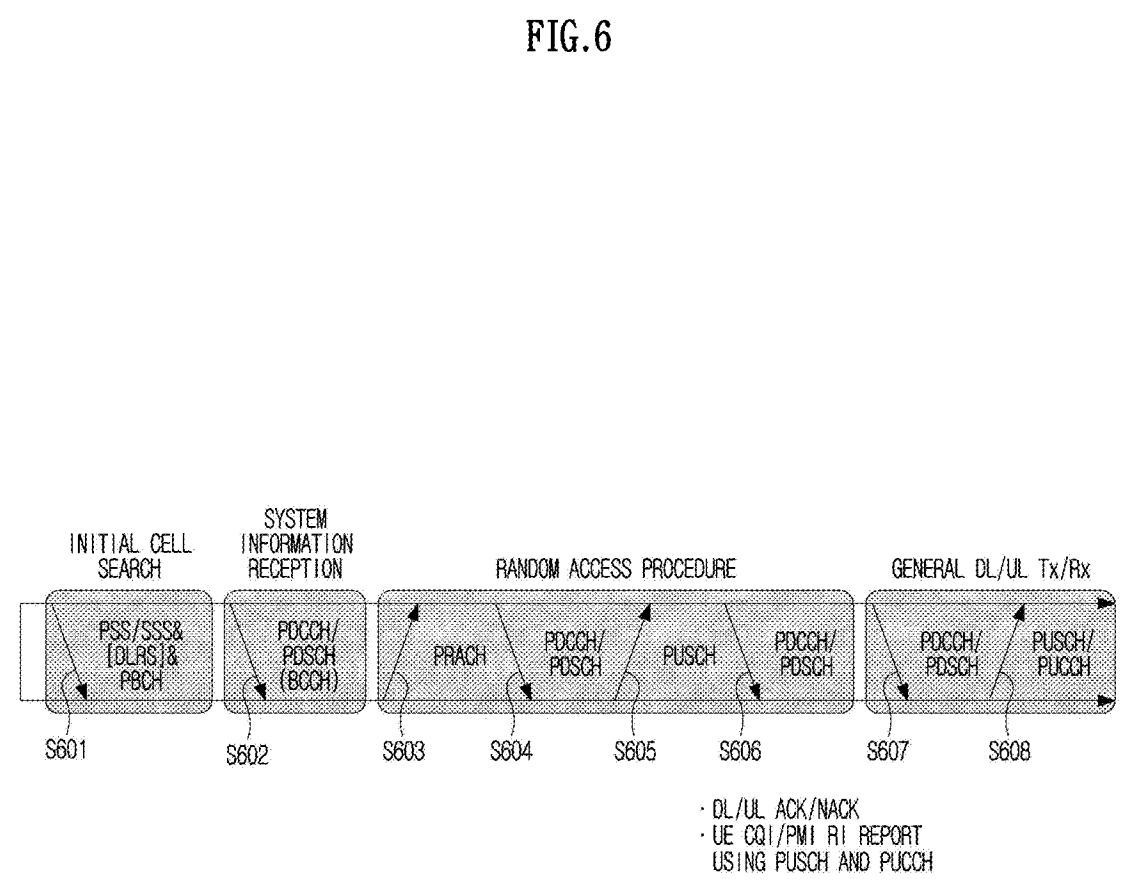

INITIAL CELL SEARCH
PSS/SSS& [DLRS]& PBCH
S601

SYSTEM INFORMATION RECEPTION
PDCCH/PDSCH (BCCH)
S602

RANDOM ACCESS PROCEDURE
PRACH
S603
PDCCH/PDSCH
S604
PUSCH
S605
PDCCH/PDSCH
S606

GENERAL DL/UL Tx/Rx
PDCCH/PDSCH
S607
PUSCH/PUCCH
S608

· DL/UL ACK/NACK
· UE CQI/PMI RI REPORT USING PUSCH AND PUCCH

METHOD AND DEVICE FOR TRANSMITTING OR RECEIVING UPLINK OR DOWNLINK IN WIRELESS COMMUNICATION SYSTEM

CROSS-REFERENCE TO RELATED APPLICATIONS

This application is a National Stage application under 35 U.S.C. § 371 of International Application No. PCT/KR2022/006351, filed on May 3, 2022, which claims the benefit of Korean Application No. 10-2021-0060881, filed on May 11, 2021. The disclosures of the prior applications are incorporated by reference in their entirety.

TECHNICAL FIELD

The present disclosure relates to a wireless communication system, and more specifically, to a method and device for performing uplink transmission and reception or downlink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing uplink transmission and reception or downlink transmission and reception in a wireless communication system.

Additionally, an additional technical problem of the present disclosure is to provide a method and device for determining whether to configure a gap symbol based on capability information related to panel activation in a wireless communication system.

In addition, an additional technical problem of the present disclosure is to provide a method and device for performing uplink transmission and reception or downlink transmission and reception based on gap symbols considering panel activation delay time in a wireless communication system.

In addition, an additional technical problem of the present disclosure is to provide a method and device for performing uplink transmission and reception or downlink transmission and reception based on gap symbols in consideration of power control changes due to beam changes in a wireless communication system.

The technical problems to be achieved by the present disclosure are not limited to the above-described technical objects, and other technical objects which are not described herein will be clearly understood by those skilled in the pertinent art from the following description.

According to one embodiment of the present disclosure, a method for a user equipment (UE) to perform uplink transmission or downlink reception in a wireless communication system may include transmitting, to the base station, capability information including first information indicating whether the UE supports a single transmission or reception configuration in a single time unit or multiple transmission or reception configurations in a single time unit; receiving, from the base station, second information related to at least one transmission occasion (TO) based on the capability information; and based on the second information, performing the uplink transmission or the downlink reception in the at least one TO.

According to another embodiment of the present disclosure, a method for a base station to perform uplink reception or downlink transmission in a wireless communication system may include receiving, from the UE, capability information including first information indicating whether the UE supports a single transmission or reception configuration in a single time unit or multiple transmission or reception configurations in a single time unit; transmitting, to the UE, second information related to at least one transmission occasion (TO) based on the capability information; and based on the second information, performing the uplink reception or the downlink transmission in the at least one TO.

According to an embodiment of the present disclosure, a method and device for performing uplink transmission and reception in a wireless communication system may be provided.

Additionally, according to an embodiment of the present disclosure, a method and device for determining whether to configure a gap symbol based on capability information related to panel activation in a wireless communication system may be provided.

Additionally, according to an embodiment of the present disclosure, a method and apparatus for performing uplink transmission and reception or downlink transmission and reception based on a gap symbol considering panel activation delay time in a wireless communication system may be provided.

Additionally, according to an embodiment of the present disclosure, a method and device for performing uplink transmission and reception or downlink transmission and reception based on a gap symbol considering power control change due to beam change in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
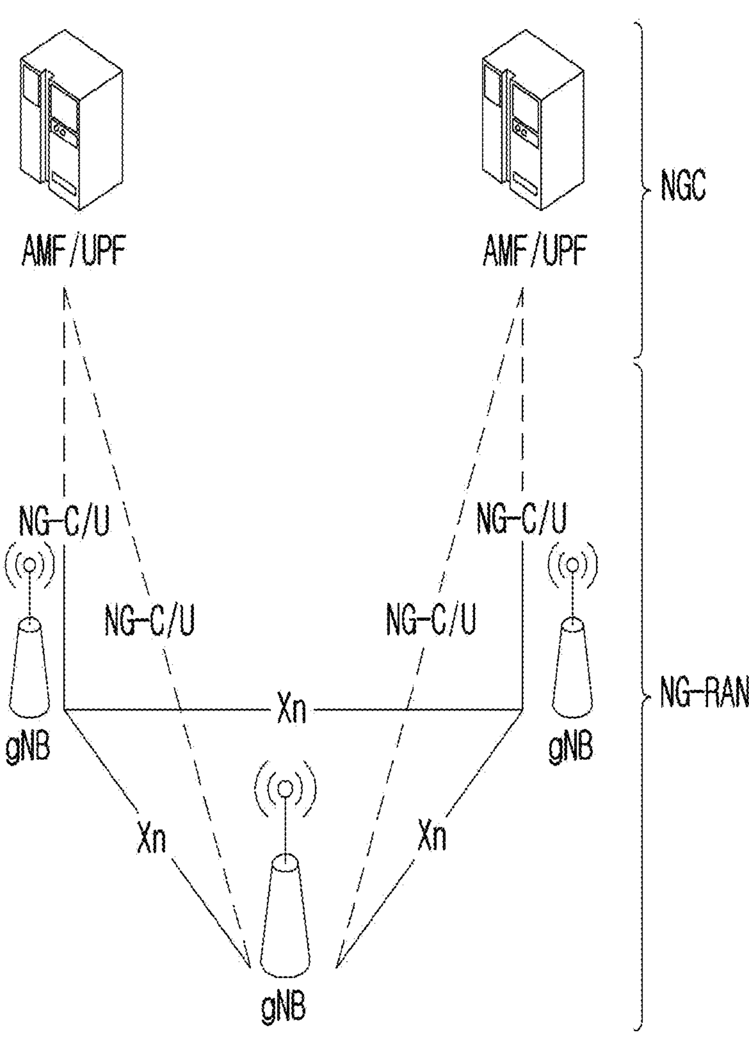
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-

20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
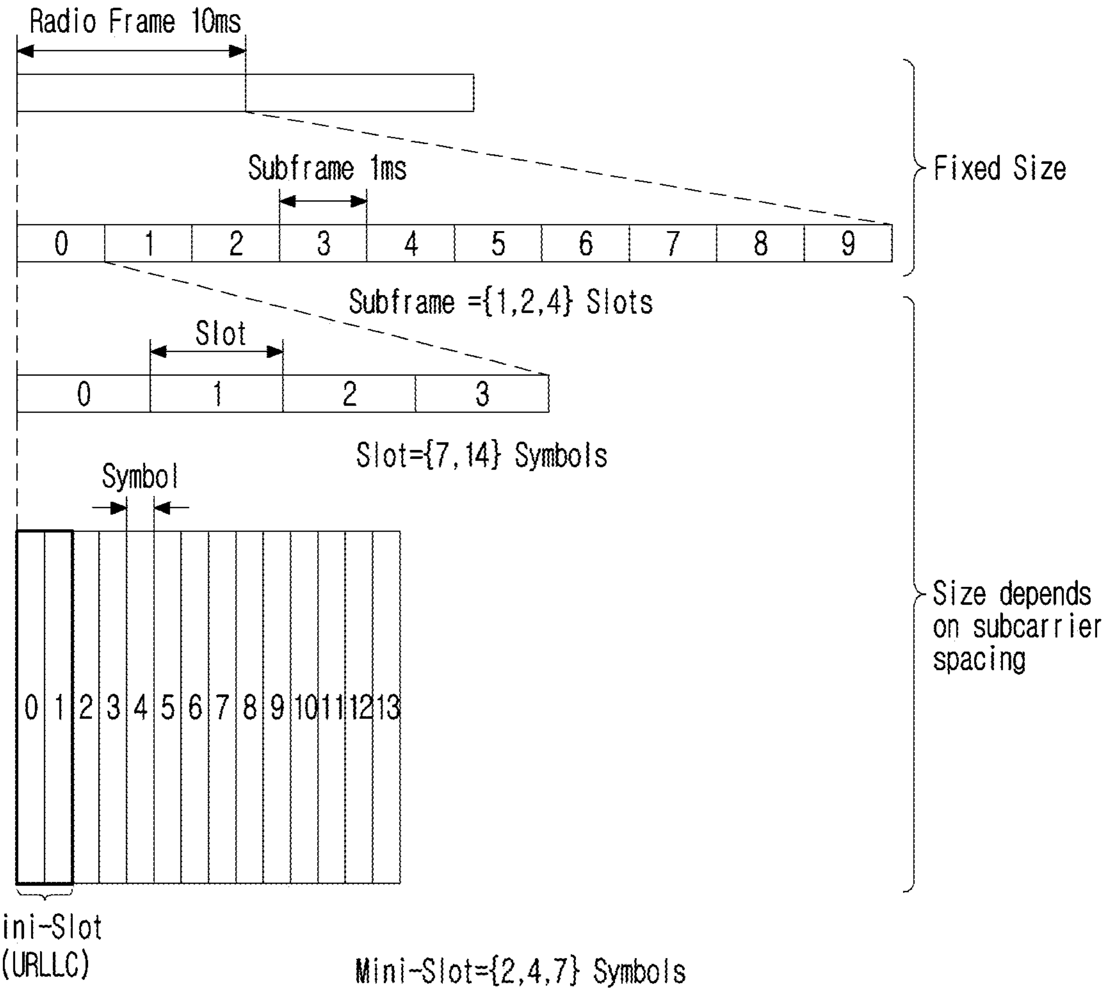
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
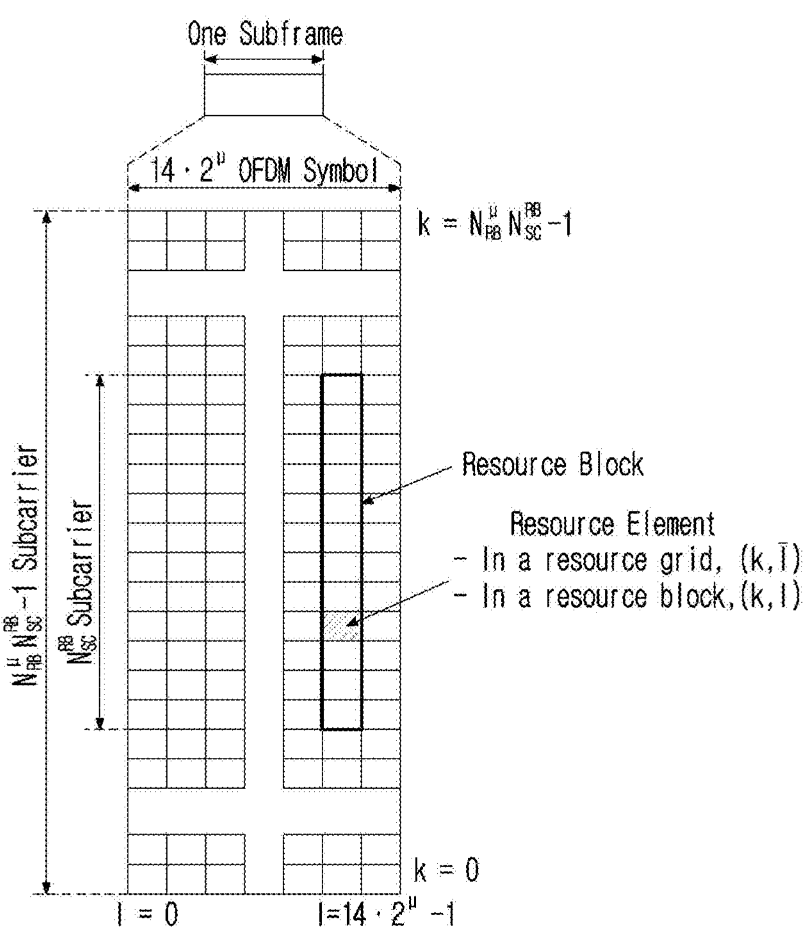
FIG. 3 illustrates a resource grid in a wireless communication system to which the present disclosure may be applied.

FIG. 2 is an example on $\mu=2$ (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for $\mu$ and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
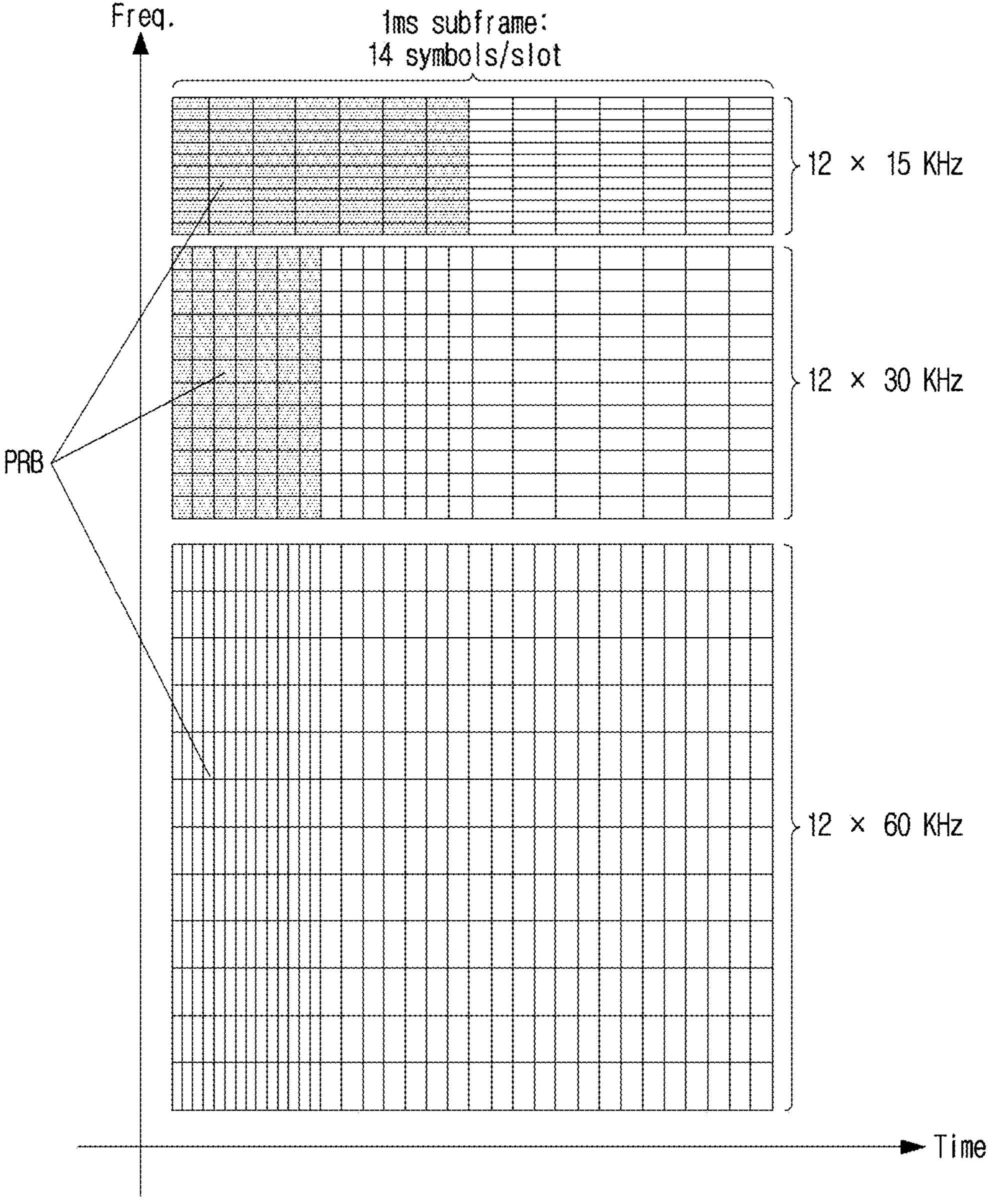
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
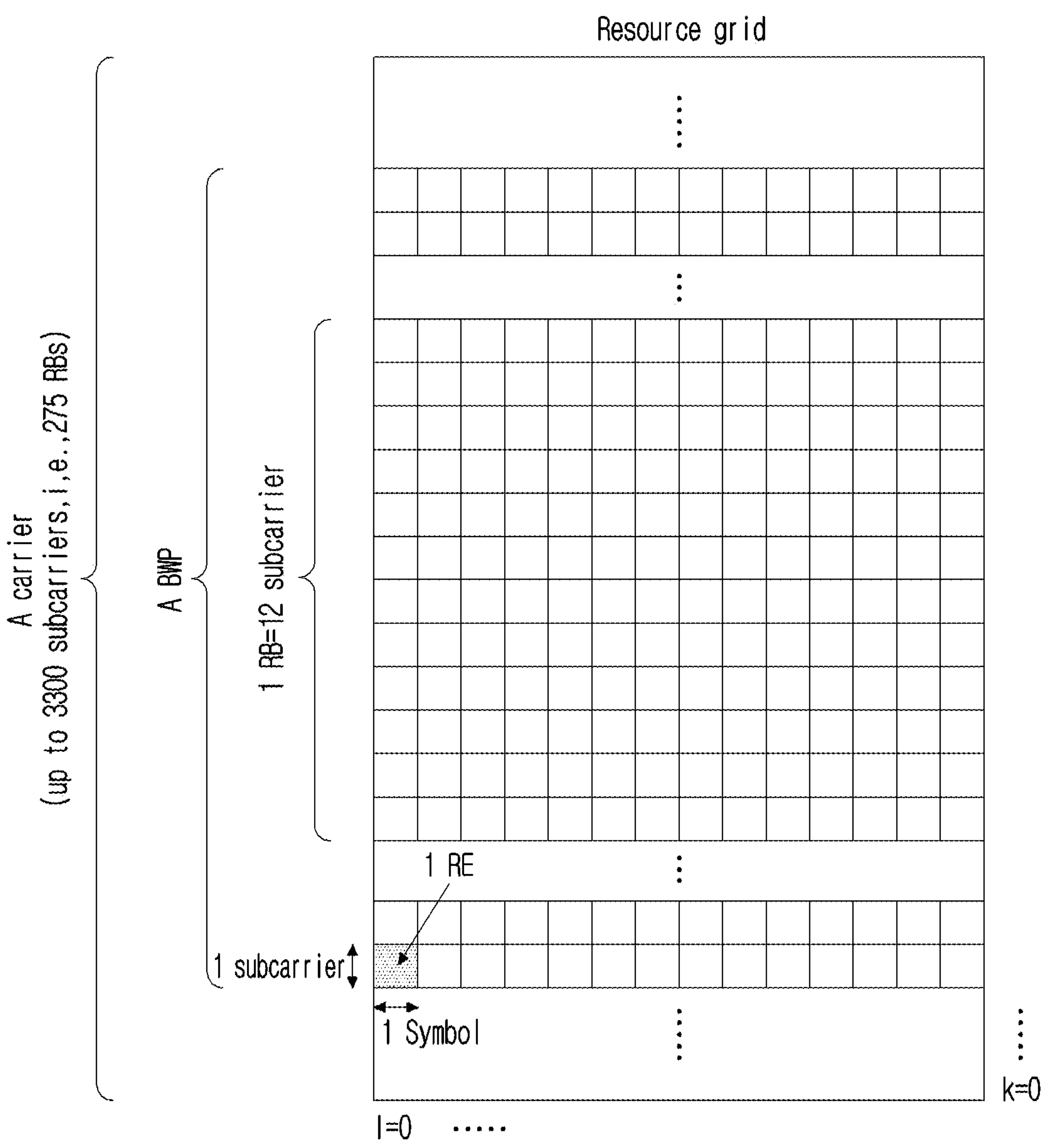
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted. Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
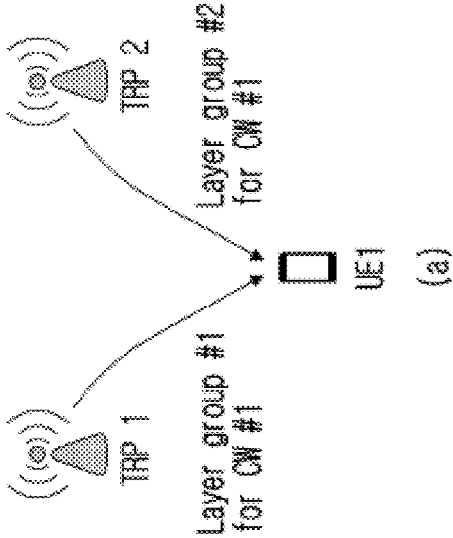
FIG. 7 illustrates a method of transmitting multiple TRPs in a wireless communication system to which the present disclosure may be applied.
Figure 7:
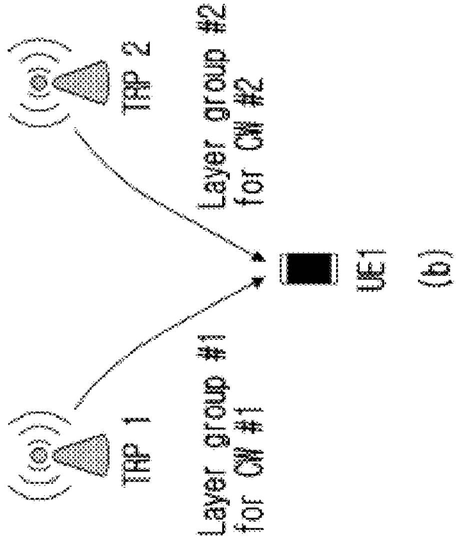

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

The DL M-TRP URLLC transmission method refers to a method in which multiple TPRs transmit the same data/DCI using different space (e.g. layer/port)/time/frequency resources. For example, TRP 1 may transmit specific data/DCI on resource 1, and TRP 2 may transmit the specific data/DCI (i.e., the same data/DCI) on resource 2.

That is, when the DL M-TRP URLLC transmission method is configured, the UE may receive the same data/DCI using different space/time/frequency resources. At this time, the UE may receive indications from the base station regarding the QCL RS/type (i.e., DL TCI status) used in the space/time/frequency resource for receiving the data/DCI.

For example, when the data/DCI is received from resource 1 and resource 2, the UE may receive indications from the base station about the DL TCI state used in resource 1 and the DL TCI state used in resource 2. By receiving the corresponding data/DCI through Resource 1 and Resource 2, high reliability can be achieved. This M-TRP URLLC transmission method may be applied to PDSCH/PDCCH.

The UL M-TRP URLLC transmission method refers to a method in which multiple TRPs receive the same data/UCI from one terminal using different space/time/frequency resources. For example, TRP 1 may receive the same data/UCI from the UE on resource 1, and TRP 2 may receive the same data/UCI from the terminal on resource 2. Additionally, TRP 1 and TRP 2 may share data/UCI received from the terminal through a backhaul link (connected between TRPs).

That is, when the UL M-TRP URLLC transmission method is configured, the UE may transmit the same data/UCI to each TRP using different space/time/frequency resources. At this time, the UE may receive indications from the base station on the Tx beam and Tx power (i.e., UL TCI state) to be used in the space/time/frequency resources transmitting the same data/UCI. For example, when the same data/UCI is transmitted on resource 1 and resource 2, the UE may receive indications from the base station of the UL TCI state used in resource 1 and the UL TCI state used in resource 2. This UL M-TRP URLLC can be applied to PUSCH/PUCCH.

Additionally, in describing the present disclosure, when receiving/transmitting data/DCI/UCI through specific space/time/frequency resources, in the cast of DL, using (or mapping) a specific TCI state (or TCI) may mean estimating a channel from DMRS using QCL type and QCL RS indicated by the specific TCI state in specific space/time/frequency resources, and receiving/demodulating Data/DCI/UCI through the estimated channel.

And, when receiving/transmitting data/DCI/UCI through specific space/time/frequency resources, in the case of UL, using (or mapping) a specific TCI state (or, TCI) may mean transmitting/modulating DMRS and data/UCI using the Tx beam and/or Tx power indicated by the specific TCI state in specific space/time/frequency resources.

And, the UL TCI state may include the UE's Tx beam or Tx power information. Additionally, the base station may configure spatial relationship information, etc. for the UE through other parameters instead of the TCI state.

For example, the UL TCI state may be directly indicated to the UE through a UL grant DCI. Alternatively, the UL TCI status may mean spatial relationship information of SRS resources indicated through the SRI (SRS resource indicator) field of the UL grant DCI. Alternatively, the UL TCI state may mean an open loop (OP) Tx power control parameter connected to the value indicated through the SRI field of the UL grant DCI.

Here, the OL Tx power control parameters may include, for example, j (index and alpha (Up to 32 parameter value sets per cell) for OP parameter(s) Po, q_d (index of DL RS resource for PL (path loss) measurement (up to 4 measurements per cell), or/and I (Closed loop power control process index (maximum 2 processes per cell)).

In another embodiment of the present disclosure, the M-TRP eMBB transmission method refers to a method in which M-TRP transmits different data/DCI using different space/time/frequency resources. If the M-TRP eMBB transmission method is configured, the UE may receive an indication of a plurality of TCI states from the base station through DCI, and may assume that the data received using the QCL RS indicated by each of the plurality of TCI states is different data.

In addition, as the RNTI for M-TRP URLLC and the RNTI for M-TRP eMBB are used separately, the UE may determine whether a specific transmission/reception is M-TRP URLLC transmission/reception or M-TRP eMBB transmission/reception. For example, if the RNTI for URLLC is used and the CRC is masked for DCI, the UE may recognize the transmission as a URLLC transmission. In addition, when the RNTI for eMBB is used and CRC is masked for DCI, the UE may recognize the transmission as an eMBB transmission. As another example, the base station may configure the M-TRP URLLC transmission/reception method or the M-TRP eMBB transmission/reception method to the UE through new signaling.

For convenience of description of the present disclosure, it is assumed that 2 TRPs cooperate with each other to perform transmission/reception operations, but the present disclosure is not limited thereto. In other words, the present disclosure may be expanded and applied in an environment with multiple TRPs of 3 or more, and may also be expanded and applied in an environment where the same TRP transmits/receives to different panels or beams. The UE may recognize different TRPs as different TCI states. When the UE transmits and receives data/DCI/UCI using TCI state 1, it means transmitting and receiving data/DCI/UCI/from TRP 1 (or to TRP 1).

The present disclosure may be used in a situation where the MT-RP cooperatively transmits the PDCCH (repeatedly transmits the same PDCCH or transmits it separately). Additionally, the present disclosure may be used in situations where M-TRP cooperatively transmits PDSCH or cooperatively receives PUSCH/PUCCH.

Additionally, in describing the present disclosure, the meaning that multiple base stations (i.e., M-TRP) repeatedly transmit the same PDCCH may mean that the same DCI is transmitted through multiple PDCCH candidates, and is the same as the meaning that multiple base stations repeatedly transmit the same DCI. Here, two DCIs with the same DCI format/size/payload may be viewed as the same DCI.

Alternatively, if the scheduling results are the same even though the payloads of the two DCIs are different, the two DCIs may be viewed as the same DCI. For example, the time domain resource allocation (TDRA) field of DCI may relatively determine the slot/symbol position of data and the slot/symbol position of A(ACK)/N(NACK) based on the reception time of DCI.

At this time, if the DCI received at time n and the DCI received at time n+1 indicate the same scheduling result to the UE, the TDRA fields of the two DCIs are different, and as a result, the DCI payloads are different. Therefore, if the scheduling results are the same even though the payloads of the two DCIs are different, the two DCIs may be viewed as the same DCI. Here, the number of repetitions R may be directly indicated by the base station to the terminal or mutually agreed upon.

Alternatively, even if the payloads of the two DCIs are different and the scheduling results are not the same, if the scheduling result of one DCI is a subset of the scheduling result of the other DCI, the two DCIs may be viewed as the same DCI.

For example, if the same data is TDMed and transmitted repeatedly N times, DCI 1 received before the first data indicates (or scheduling) data repetition N times, and DCI 2 received before the second data indicates N−1 data repetition (scheduling). At this time, the scheduling result (or data) of DCI 2 is a subset of the scheduling result (or data) of DCI 1, and both DCIs have scheduling results for the same data. Therefore, even in this case, the two DCIs may be considered the same DCI.

And, in explaining the present disclosure, Multiple base stations (i.e., M-TRP) transmitting the same PDCCH separately means that one DCI is transmitted through one PDCCH candidate, TRP 1 transmits some resources defined for the PDCCH candidate, and TRP 2 This may mean transmitting the remaining resources.

For example, when TRP 1 and TRP 2 separately transmit PDCCH candidates corresponding to aggregation level m1+m2, the PDCCH candidate is divided into PDCCH candidate 1 corresponding to merge level m1 and PDCCH candidate 2 corresponding to merge level m2, TRP 1 may transmit PDCCH candidate 1, and TPR 2 may transmit PDCCH candidate 2. At this time, TRP 1 and TRP 2 may transmit PDCCH candidate 1 and PDCCH candidate 2 using different time/frequency resources. After receiving PDCCH candidate 1 and PDCCH candidate 2, the UE may generate a PDCCH candidate corresponding to merge level m1+m2 and attempt DCI decoding.

At this time, the method in which the same DCI is transmitted by dividing it into several PDCCH candidates may be implemented in the following two ways.

In the first method, the DCI payload (e.g., control information+CRC) is encoded through one channel encoder (e.g., polar encoder) and transmitted divided into two TRPs. That is, the first method refers to a method in which coded bits obtained according to the encoding result are divided into two TRPs and transmitted. Here, the entire DCI payload may be encoded in the coded bits transmitted by each TRP, but this is not limited to this, and only a portion of the DCI payload may be encoded.

The second method is to divide the DCI payload (e.g., control information+CRC) into two DCIs (e.g., DCI 1 and DCI 2) and then encode each through a channel encoder (e.g., polar encoder). Thereafter, each of the two TRPs may transmit a coded bit corresponding to DCI 1 and a coded bit corresponding to DCI 2 to the UE.

That is, multiple base stations (MTRPs) dividing/repeating the same PDCCH to transmit across multiple MOs may mean that 1) the coded DCI bits encoding the entire DCI content of the corresponding PDCCH are repeatedly transmitted through each MO for each base station (STRP), 2) the coded DCI bits encoding the entire DCI content of the corresponding PDCCH are divided into a plurality of parts, and different parts are transmitted for each base station (STRP) through each MO, or 3) the DCI content of the corresponding PDCCH is divided into a plurality of parts, different parts are separately encoded for each base station (STRP), and transmitted through each MO.

Repeated/divided transmission of the PDCCH may be understood as transmitting the PDCCH multiple times over several TO (transmission occasions).

Here, TO means a specific time/frequency resource unit in which the PDCCH is transmitted. For example, if the PDCCH is transmitted multiple times (to a specific RB) over slots 1, 2, 3, and 4, TO may mean each slot, if the PDCCH is transmitted multiple times (in a specific slot) over RB sets 1, 2, 3, and 4, TO may mean each RB set, or if the PDCCH is transmitted multiple times over different times and frequencies, TO may mean each time/frequency resource. In addition, a TCI state used for DMRS channel estimation may be set differently for each TO, and it may be assumed that a TO with a different TCI state is transmitted by different TRP/panel.

A plurality of base stations repeatedly transmitting or dividing the PDCCH to transmit may mean that a PDCCH is transmitted across multiple TOs, and the union of the TCI states established in those TOs consists of two or more TCI states. For example, when the PDCCH is transmitted over TO 1, 2, 3, 4, TCI states 1, 2, 3, 4 may be configured in each of TO 1, 2, 3, 4, which means that TRP i cooperatively transmits PDCCH in TO i.

in describing the present disclosure below, the UE repeatedly transmitting the same PUSCH so that multiple base stations (i.e., MTRPs) receive it may mean that the same data is transmitted through a plurality of PUSCHs, and each PUSCH may be optimized and transmitted for uplink channels of different TRPs.

For example, the UE may repeatedly transmit the same data through PUSCH 1 and 2, and the UE may transmit PUSCH 1 using UL TCI state 1 for TRP 1, and the UE may receive and transmit a value optimized for a channel of TRP 1 for link adaptation such as precoder/MCS as well. The UE may transmit PUSCH 2 by using UL TCI state 2 for TRP 2, and the UE may transmit by scheduling a value optimized for the channel of TRP 2 for link adaptation such as precoder/MCS. In this case, repeatedly transmitted PUSCHs 1 and 2 may be transmitted at different times to be TDM, FDM, or SDM.

In addition, in describing the present disclosure below, the UE dividing and transmitting the same PUSCH so that multiple base stations (i.e., MTRP) may receive it may mean that one data is transmitted through one PUSCH, but the resources allocated to the PUSCH are split and optimized for UL channels of different TRPs for transmission.

For example, the UE may transmit the same data through 10 symbol PUSCH, and may transmit the first 5 symbols using UL TCI state 1 for TRP 1, and may receive and transmit a value optimized for link adaptation such as precoder/MCS and TRP 1 channel. The UE may transmit the remaining 5 symbols using UL TCI state 2 for TRP 2, and the UE may receive and transmit a value optimized for the channel of TRP 2 in link adaptation such as precoder/MCS.

In the above example, one PUSCH may be divided into time resources to perform TDM transmission for TRP 1 and TRP 2, but it may be transmitted using FDM/SDM.

The UE may repeatedly transmit PUCCH to multiple base stations (similar to PUSCH transmission) or transmit the same PUCCH separately.

The present disclosure may be expanded and applied to various channels such as PUSCH/PUCCH/PDSCH/PDCCH. Additionally, the present disclosure can be extended and applied to both the case of repeatedly transmitting the channel to different space/time/frequency resources and the case of divided transmission.

Method for Determining Whether to Configure/Indicate a Gap Symbol Based on Capability Information in an M-TRP Environment In an M-TRP environment, when PUSCH/PUCCH/PDSCH/PUCCH is configured to be transmitted repeatedly or separately, a gap symbol may not exist between PUSCH/PUCCH/PDSCH/PUCCH (TO) which is transmitted repeatedly or separately.

Here, it is assumed that among the multiple panels (e.g., 2 panels) of the UE, only panel 1 is activated, and beam 1 is transmitted/received toward TRP 1 from panel 1, and beam 2 is transmitted/received toward TRP 2 from panel 2. To transmit/receive beam 2 through panel 2 after beam 1 is transmitted/received through panel 1, panel 2 must be activated, and a panel activation delay may be required at this time. Due to the existence of the panel activation delay time, beam 2 through panel 2 may not be transmitted/received normally at the previously scheduled transmission time.

Accordingly, in an M-TRP environment, when PUSCH/PUCCH/PDSCH/PUCCH is configured to be transmitted repeatedly or dividedly, application of a gap symbol may be necessary at a time when activation of the panel is required due to a change in the transmission/reception beam or a change in the transmission/reception beam.

Alternatively, when each of the PUSCH/PDSCH scheduled by different DCIs is configured to be transmitted/received through different beams and the transmission time points through each beam are adjacent, a gap symbol may need to be applied depending on the beam change when panel activation is required (or, when panel switching is required depending on beam change).

Hereinafter, a method for determining whether to configure a gap symbol (gap) based on the capability information of the UE and a method for uplink/downlink transmission and reception of the UE/base station in an M-TRP environment are described.

Figure 8:
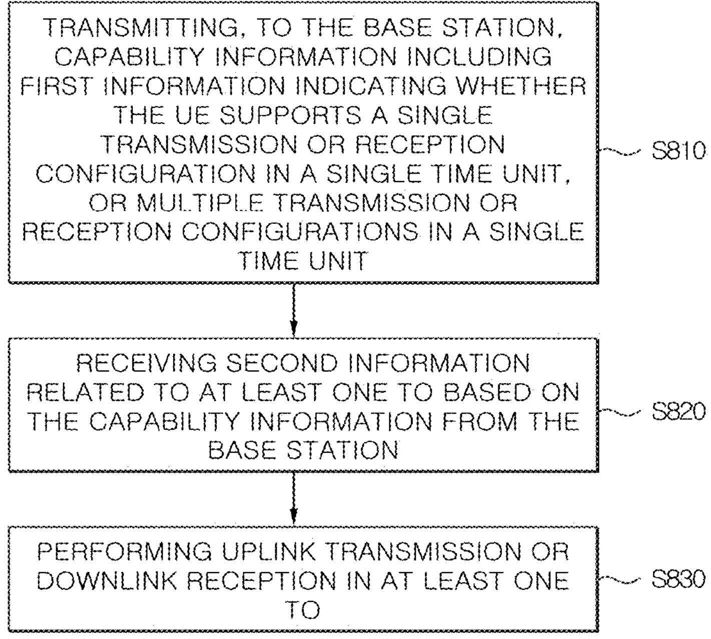
FIG. 8 is a diagram for describing an uplink transmission operation or a downlink reception operation of a terminal in a wireless communication system to which the present disclosure may be applied.

FIG. 8 is a diagram for describing an uplink transmission operation or a downlink reception operation of a terminal, according to an embodiment of the present disclosure.

The UE may transmit capability information including first information indicating whether the UE supports a single transmission or reception configuration in a single time unit, or multiple transmission or reception configurations in a single time unit (S810).

Here, Supporting the single transmission and reception configurations in a single time unit includes support for activating only a single panel among a plurality of panels in a single time unit (or, support of single transmit and receive configurations at a time), and supporting multiple transmission and reception configurations in a single time unit (or support of multiple transmission and reception configurations simultaneously) may include support of activation of multiple panels in a single time unit.

In describing the present disclosure, a single time unit may mean TO of the time concept, but is not limited thereto and may mean a time unit that is predefined or configured/indicated by the base station. For example, a single time unit may refer to a time unit for activation of a panel.

And, in describing the present disclosure, one panel may correspond to one TRP/beam/CORESET pool index/resource set (e.g., SRS resource set, etc.). For example, in a first panel, transmission and reception may be performed through a first beam directed toward the first TRP, and in a second panel, transmission and reception may be performed through a second beam toward the second TRP. However, this is only an example, and the TRP/beam/CORESET pool index corresponding to each panel may be configured differently.

As another example, the first panel may correspond to a first SRS resource set, and the second panel may correspond to a second SRS resource set. And, one or more SRS resources (e.g., a resource indicated by an SRS resource indicator) included in the first SRS resource set may correspond to the first beam (or, TCI state/spatial relation information related to the first beam, etc.), and one or more SRS resources (e.g., a resource indicated by an SRS resource indicator) included in the second SRS resource set may correspond to the second beam.

The UE may receive second information related to at least one transmission occasion (TO) based on the capability information from the base station (S820).

And, based on the second information, the UE may perform uplink transmission or downlink reception in at least one TO (S830).

Here, TO may mean time (e.g., symbol, slot, etc.)/frequency (e.g., subcarrier, RB, etc.)/space (e.g., layer, beam, etc.) resource unit for performing transmission/reception operations.

The uplink transmission may include at least one of transmission of an physical uplink shared channel (PUSCH) or an physical uplink control channel (PUCCH), and the downlink reception may include reception of a physical downlink shared channel (PDSCH).

Here, the capability information may further include at least one of i) information on an activated panel among a plurality of panels (e.g., 2 panels), ii) information on the time required to activate a single panel, or iii) a minimum time offset between the time when downlink control information (DCI) including second information is received and the initial TO at which the uplink or the downlink is to be transmitted or received. Accordingly, the base station may check at least one of information on the currently activated panel among the plurality of panels of the UE, information on the time required to activate a single panel, or the minimum time offset expected by the UE.

However, this is only an embodiment, and at least one of the information i), ii), or iii) described above may be transmitted to the base station through separate signaling rather than capability information.

As an example of the present disclosure, assume that the UE supports activation of only a single panel among a plurality of panels in a single time unit (Case 2-1, described later). That is, assume that the first information included in the capability information indicates that the UE supports activation of only a single panel in a single time unit. The second information may include information for configuring/indicating a gap symbol between a first TO among at least one TO and a second TO adjacent to the first TO.

Here, the first TO is a TO in which the uplink transmission or downlink reception is performed by an activated first panel among a plurality of panels, and the second TO may be a TO in which uplink transmission or downlink reception is performed by an activated second panel among a plurality of panels.

Specifically, if the first panel was activated in the first TO (i.e., uplink or downlink transmission and reception were performed through the first panel), but the second panel should be activated in the second TO (i.e., when uplink or downlink transmission and reception must be performed through the second panel), the UE must deactivate the first panel and activate the second panel in the second TO. Accordingly, the base station may configure/indicate a gap symbol between the first TO and the second TO.

That is, the base station configures/indicates a gap symbol every time the activated panel changes, so that the UE may activate/deactivate each panel within the gap symbol and perform uplink or downlink transmission and reception operations.

As another example of the present disclosure, assume that the UE supports multiple activations in a single time unit (Case 1, described later) (or supports multiple activations simultaneously). That is, assume that the first information included in the capability information indicates that the UE supports activation of a plurality of panels in a single time unit, and the capability information indicates that all of the plurality of panels are activated. The second information may not include information for configuring/indicating a gap symbol. Accordingly, uplink transmission or downlink reception by the UE may be performed in one or more TOs to which gap symbols are not applied.

As another example of the present disclosure, assume that the UE supports activation of multiple panels in a single time unit, and only the first panel (i.e., only a single panel) among the multiple panels is currently activated (Case 2-2, described later). That is, assume that the first information included in the capability information indicates that the UE supports activation of a plurality of panels in a single time unit, and the capability information indicates that the first panel (i.e., single panel) among the plurality of panels is currently activated.

At this time, the second information may include information for configuring/indicating a single gap symbol between the first TO among at least one TO and the second TO adjacent to the first TO.

Here, the first TO is a TO in which uplink transmission or downlink reception is performed by the first panel activated among the plurality of panels, and the second TO may be a TO in which uplink transmission or downlink reception is performed by a second panel among a plurality of panels that are all activated.

Specifically, if the first panel was activated in the first TO (i.e., uplink or downlink transmission and reception were performed through the first panel), but the second panel should be activated in the second TO (i.e., when uplink or downlink transmission and reception should be performed through the second panel), the UE may activate both the first panel and the second panel in the second TO. Accordingly, the base station may configure/indicate one gap symbol between the first TO and the second TO that additionally activates the second panel.

That is, the base station configures/indicates one gap symbol at the time the second panel is activated, and the UE may activate all panels within the gap symbol and perform uplink or downlink transmission and reception operations.

As another example of the present disclosure, based on the UE supporting activation of multiple panels in a single time unit and only the first panel among the multiple panels is activated, a time offset between the time when the DCI including the second information is received and the TO at which the PUSCH or PDSCH scheduled by the DCI is first transmitted or received may be received from the base station.

As an example, based on the time offset having a value equal to or greater than at least one of the time required to activate a single panel or the minimum offset, during the time offset after the DCI is received, a plurality of panels may all be activated by the UE.

As another example, based on the time offset having a value less than at least one of the time required to activate a single panel or the minimum offset above, during the time offset after the DCI is received, uplink or downlink may be transmitted or received only in the initial TO among at least one TO, or scheduling by DCI (e.g., second information) may be ignored.

As another example of the present disclosure, based on the UE supporting activation of a plurality of panels in a single time unit and only the first panel among the plurality of panels is activated, i) a first time offset between the time when the DCI including the second information is received and the time when the PDSCH scheduled by the DCI is received and ii) a second time offset between the time at which the PDSCH is received and the TO at which the PUCCH including an acknowledgment (ACK)/negative acknowledgment (NACK) for the PDSCH is first transmitted may be received from the base station.

Here, the sum of the first time offset and the second time offset may have a value equal to or greater than at least one of the time required to activate a single panel or the minimum offset. And, during the sum of the first time offset and the second time offset after the DCI is received, a plurality of panels may all be activated by the terminal.

In addition, an example in which the second information is included in DCI and received from the base station has been described, but the present invention is not limited to this, and the second information may be included in separate signaling (e.g., higher layer signaling) and received from the base station.

As another example of the present disclosure, at least one TO may include a first TO and a second TO adjacent to the first TO. Based on uplink or downlink being transmitted based on the first panel or first beam in the first TO, and uplink or downlink being transmitted based on the second panel or second beam in the second TO, the second information may include information configuring/indicating a gap symbol between the first TO and the second TO.

Figure 9:
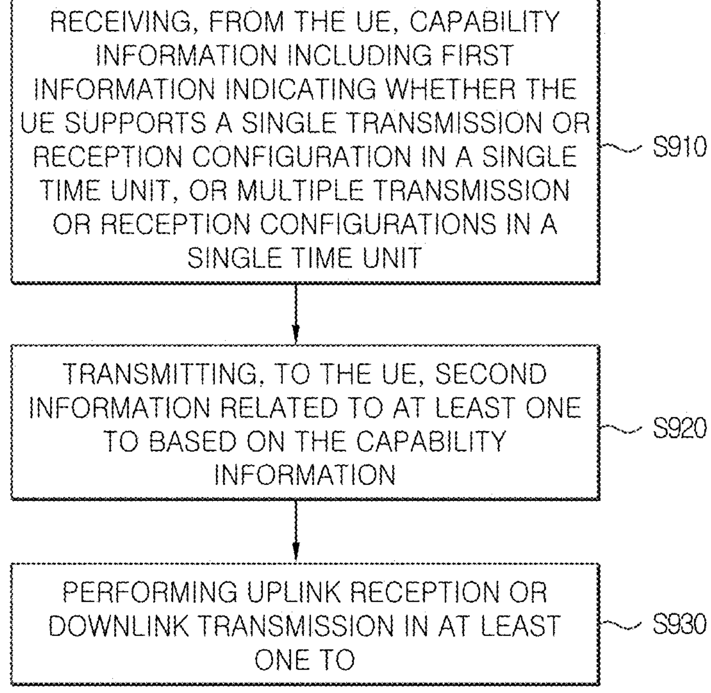
FIG. 9 is a diagram for describing an uplink reception operation or a downlink transmission operation of a base station in a wireless communication system to which the present disclosure may be applied.

FIG. 9 is a diagram illustrating a method of performing uplink reception or uplink transmission by a base station, according to an embodiment of the present disclosure.

The base station may receive, from the UE, capability information including first information indicating whether the UE supports a single transmission or reception configuration in a single time unit, or multiple transmission or reception configurations in a single time unit (S910).

The base station may transmit, to the UE, second information related to at least one transmission TO based on the capability information (S920).

The base station may perform the uplink transmission or the downlink reception based on the second information in the at least one TO (S930).

Regarding capability information, first information, second information, gap symbol setting/instruction method based thereon, and communication performance method, features described with reference to steps S810 to S830 of FIG. 8 and specific examples described later may be applied to steps S910 to S930.

Hereinafter, a method of determining whether to configure a gap symbol based on the capability information of the UE and a method of uplink/downlink transmission and reception of the terminal/base station in an M-TRP environment will be described.

Embodiment 1

In a wireless communication system, when M-TRP PUSCH/PUCCH/PDSCH/PUCCH is configured to be transmitted/received repeatedly or separately, a gap symbol (or symbol gap) may be applied between two PUSCH/PDCCH/PDSCH/PUCCH transmission/reception points where transmission/reception beams or power changes.

However, this is only an embodiment. When it is indicated/configured that not only repetitive transmission but also scheduled uplink/downlink is transmitted/received by different control/configuration information, and when the transmission/reception beam or power of the corresponding uplink/downlink changes, a gap symbol may be applied between the corresponding uplink/downlink transmission/reception points.

For example, when PUSCH is repeatedly transmitted four times (i.e., when TB is repeatedly transmitted during four PUSCH TO), Beam 1 toward TRP 1 and beam 2 toward TRP 2 may be cyclically or sequentially mapped to PUSCH TO No. 4. For convenience of description of the present disclosure, each of the four PUSCHs will be named PUSCH 1, 2, 3, and 4.

For example, when circular mapping is configured, beams 1, 2, 1, and 2 are applied to PUSCHs 1, 2, 3, and 4, respectively, and when comparing two consecutive TOs, the beams may change a total of three times. As another example, when sequential mapping is configured, beams 1, 1, 2, and 2 are applied to PUSCHs 1, 2, 3, and 4, respectively, and when comparing two consecutive TOs, the beams may change a total of once.

When the beam is changed (i.e., changed from beam 1 to beam 2), the beam before the change and the beam after the change (i.e., beam 1 and beam 2) may each be transmitted from different panels. At this time, the UE may change the beam with both panels activated (case 1), or may change the beam while only the panel corresponding to the beam before the change is activated and the other panels are not activated (Case 2).

In Case 1, the UE was activating both panels, so no additional time is required to activate the panels due to beam changes. Accordingly, the beam change may be made quickly (e.g., within 1 OFDM symbol).

Therefore, in Case 1, PUSCH transmission may be possible without additional gap symbols for beam change. For example, PUSCH 1, 2, 3, and 4 may each be transmitted back-to-back (or sequentially) via TDM. For example, PUSCH 1, 2, 3, and 4 may each be transmitted in units of 2 symbols. That is, PUSCH 1 may be transmitted in OFDM symbols 0 and 1, PUSCH 2 may be transmitted in OFDM symbols 2 and 3, PUSCH 3 may be transmitted on symbols 4 and 5, and PUSCH 4 may be transmitted in OFDM symbols 6 and 7.

As another example, in Case 2, it may take several OFDM symbols for the UE to activate the panel corresponding to the changing beam, so it may take several symbols depending on the beam change. Therefore, in Case 2, PUSCH transmission may be possible only when an additional gap symbol for beam change is configured.

Case 2 may include a case where the UE can activate only one panel at a time (case 2-1) and a case where the terminal can activate both multiple panels (e.g., two panels in an M-TRP environment, etc.) (case 2-2).

In Case 2-1, since the panel must be newly activated every time the beam changes, a gap symbol may be needed every time the beam changes (or between TO before the beam changes and TO after the beam changes). For example, when repetitive PUSCH transmission with circular mapping (e.g., PUSCH 1, 2, 3, and 4 are transmitted) is performed, gap symbols may be required between PUSCH 1 and 2, between PUSCH 2 and 3, and between PUSCH 3 and 4. That is, a gap symbol may be applied at each point in time when the panel is newly activated as the beam changes (for example, between TOs for newly activating the panel when the beam changes).

In Case 2-2, a symbol gap may be applied only between the two TOs whose beams change first among the N repeatedly transmitted TOs. For example, when repetitive PUSCH transmission with cyclic mapping is performed (e.g., PUSCH 1, 2, 3, and 4 are transmitted), a gap symbol is applied only between PUSCH 1 and 2 (i.e., only between the TO where PUSCH 1 and 2 are to be transmitted), and may be transmitted (back-to-back) without a gap symbol in the remaining TOs.

In other words, since the UE activates both panels only when the initial beam changes, and then keeps both panels activated until repeated transmission ends (i.e., until the last Nth PUSCH is received), gap symbols are applied only between PUSCH 1 and 2 (i.e., only between TOs where PUSCH 1 and 2 will be transmitted), and the remaining TOs may be transmitted without gap symbols. Accordingly, repeated PUSCH transmission may be completed quickly (compared to Case 2-1), and the base station may quickly complete PUSCH decoding.

Embodiment 2

When Case 2-2 described in Embodiment 1 is applied, gap symbols may not be configured in all TOs. Specifically, the base station may indicate time resource allocation for the initial TO through the SLIV (start and length indicator value) field of the UL grant DCI (e.g., DCI format 0_0, 0_1, 0_2). At this time, the base station may indicate a time offset between DCI and the first PUSCH TO.

Here, if the time offset is configured sufficiently long considering the panel activation time, the UE may already activate both panels when receiving the first PUSCH TO. In this case, the UE may report to the base station the minimum (time) offset value (i.e., minimum offset value required between the time the DCI is received and the time of the first PUSCH TO) required between DCI-to-first PUSCH TO ($1^{ST}$ PUSCH TO), considering the panel activation time. The base station may configure the minimum offset value required between DCI-to-first PUSCH TO ($1^{ST}$ PUSCH TO) by considering the offset value reported by the UE. Alternatively, the UE may expect the base station to configure the minimum offset value required between DCI-to-first PUSCH TO ($1^{ST}$ PUSCH TO) to a value greater than or equal to the offset value reported above.

If the above-mentioned features are not satisfied (i.e., if the base station does not configure the minimum offset value required between DCI-to-first PUSCH TO to a value higher than the offset value reported by the UE, or if the base station configures the offset value to a value smaller than the UE's panel activation time, etc.), the UE may ignore the DCI and not receive PUSCH, or may receive only the first PUSCH TO.

As another example, the above description may also be applied to (ACK/NACK) PUCCH transmission operation. Specifically, for the UE's (ACK/NACK) PUCCH transmission, the base station may dynamically indicate HARQ-ACK PUUCCH to the UE through the PRI (PUCCH resource indicator) of the DL grant DCI.

Here, the base station may indicate the PDSCH-to-PUCCH time offset (i.e., the time offset between the PDSCH reception time of the UE and the PUCCH transmission time) to the UE through the PDSCH-to-HARQ feedback timing indicator of the corresponding DCI. When the PUCCH indicated by the PRI is used for M-TRP transmission, like the above-described PUSCH operation, the base station may configure the PDSCH-to-PUUCH time offset sufficiently long in consideration of the panel activation time of the UE. Accordingly, a gap symbol may not be configured in each TO for performing PUCCH repeated transmission.

Even in this case, the UE may report to the base station the minimum (time) offset value (e.g., the sum of the time offset value from the time the DCI is received until the PDSCH is received, and the time offset value from the time the PDSCH is received until the PUCCH including ACK/NACK for the PDSCH is transmitted) transmission time required between DCI-to-first PUCCH TO ($1^{ST}$ PUCCH TO) considering the panel activation time. The base station may configure the DCI-to-PUCCH time offset to a value greater than or equal to the reported minimum (time) offset value.

Embodiment 3

The UE may distinguish Case 1/2-1/2-2 and report it to the base station as UE capability. For example, the UE may report UE capabilities including information indicating that it may support at least one of Case 1/2-1/2-2 to the base station. As another example, the UE may report UE capabilities indicating that it utilizes at least one of Case 1/2-1/2-2 as a panel/beam operation method to the base station.

Additionally, the base station may report the panel activation state (e.g., information indicating which panel has been activated (or which panel is currently activated), information indicating whether it is scheduled to be activated within a certain time, information indicating whether it is scheduled to be deactivated within a certain time, etc.) and activation time (i.e., the time it takes to activate) to the base station. The above information may be included in terminal capabilities and reported to the base station, but is not limited to this and may be reported to the base station through separate signaling.

For example, the UE may report information about case 2-1 (i.e., information indicating that the UE may activate only one panel at a time) to the base station, and report which panel is currently activated and the activation time to the base station. The base station may configure/apply a gap symbol between PUSCH TO based on the reported information.

As another example, the UE may report information on Case 2-2 or/and Case 1 (i.e., information indicating that the UE may activate two panels at one time) to the base station, and report which panel is currently activated and the activation time to the base station. The base station may configure/apply or not configure/apply a gap symbol between PUSCH TO based on the reported information. For example, when both panels are activated, the base station and the UE may operate according to Case 1 described above (i.e., a case in which a gap symbol is not applied between PUSCH TO). And, when only one panel is activated, the base station and UE may operate according to Case 2-2 described above.

Embodiment 4

In Embodiments 1 to 3, an embodiment in which the beam is changed for each TO was described. When the beam changes, the PC set for UL power control (PC) (e.g., P0, alpha, pathloss RS, closed loop index, etc.) may also change.

Here, P0 may mean a power control offset parameter, alpha may mean a power control scaling parameter, and path loss RS may mean information about RS for calculating/estimating path loss.

Although, in Embodiments 1 to 3, gap symbols that can be applied based on when the transmission/reception beam changes are described, the configuration of the gap symbol may be applied when the PC set is changed or when the transmission power is changed.

Alternatively/Additionally, regardless of Case 1/2-1/2-2 described above, the base station may configure/indicate 1 gap symbol between UL TOs of UEs with different UL powers (or/and accompanying/accompanied by panel switching), considering the different UL powers applied to each TO.

Regardless of whether or not the panel is activated, the panel switching operation between TOs of the UE may include completing transmission on one panel after a specific TO and performing transmission on the other panel at the next TO. At this time, an off-to-on power transient period may exist in the other panel. If the transient period exceeds the CP (cyclic prefix) period within the OFDM symbol, deterioration of channel/RS transmission performance of the next TO may occur. Accordingly, the base station may guarantee UL transmission quality by (always) configuring/indicating a 1-gap symbol between TOs that accompany/accompany panel switching.

For convenience of description of the present disclosure, Embodiments 1 to 4 mainly describe examples of PUSCH transmission, but are not limited thereto. Since the same problem may occur during M-TRP PUCCH transmission, Embodiments 1 to 4 may be extended and applied also during PUCCH transmission.

Additionally, in the case of M-TRP PDSCH (repetitive) transmission operation, the reception beam of the UE may change as the transmission TRP changes. At this time, since the receiving panel for each receiving beam may be different, the above-described problems related to the panel activation state may also be applied when transmitting the M-TRP PDSCH. Therefore, Embodiments 1 to 4 may be extended and applied even when receiving M-TRP PDDSCH.

Figure 10:
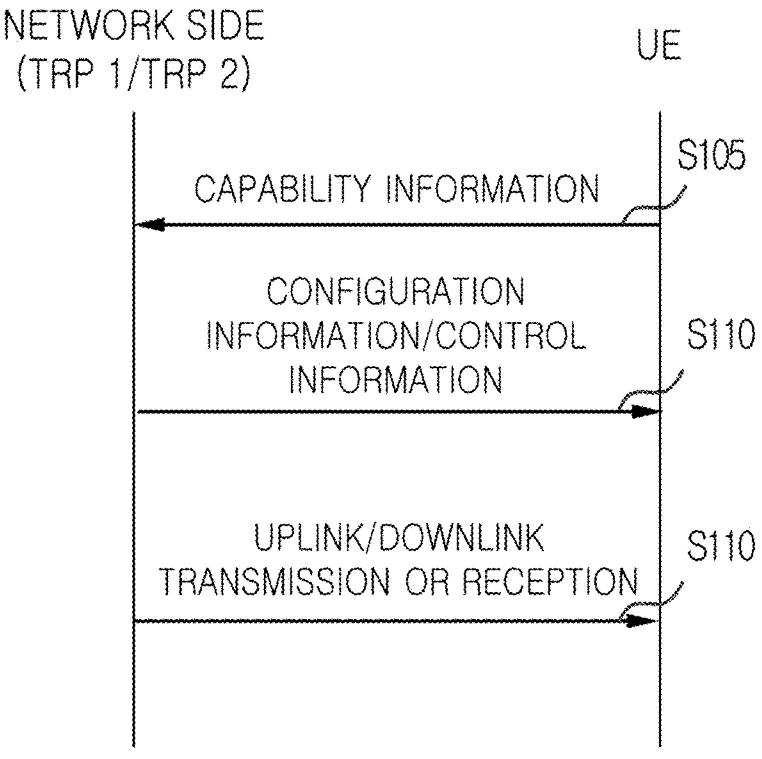
FIG. 10 is a diagram for describing the signaling procedure of the network side and the terminal according to an embodiment of the present disclosure.

FIG. 10 is a diagram for describing the signaling procedure of the network side and the UE according to an embodiment of the present disclosure.

FIG. 10 shows an example of signaling between a network side and a terminal (UE) (e.g., Embodiment 1, Embodiment 2, Embodiment 3, Embodiment 4, or a combination of one or more of their specific Embodiments) in an M-TRP situation to which the examples of the present disclosure described above may be applied.

Here, the UE/network side is an example and may be replaced with various devices as described with reference to FIG. 11. FIG. 10 is for convenience of explanation and does not limit the scope of the present disclosure. Additionally, some step(s) shown in FIG. 10 may be omitted depending on the situation and/or settings. Additionally, in the operation of the network side/UE in FIG. 10, the above-described uplink transmission/reception operation, M-TRP-related operation, etc. may be referenced or used.

In the following description, the network side may be one base station including multiple TRPs, or may be one cell including multiple TRPs. Alternatively, the network side may include a plurality of remote radio heads (RRH)/remote radio units (RRU). For example, ideal/non-ideal backhaul may be set between TRP 1 and TRP 2, which constitute the network side. In addition, the following description is based on multiple TRPs, but it can be equally extended and applied to transmission through multiple panels/cells, and can also be extended and applied to transmission through multiple RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may transmit capability information to the network (S105).

For example, the capability information may include information indicating whether the UE supports a single transmission or reception configuration in a single time unit, or multiple transmission or reception configurations in a single time unit. As another example, the capability information includes at least one of i) information on the activated panel among the plurality of panels, ii) information on the time it takes to activate a single panel, or iii) a minimum time offset between the time when downlink control information (DCI) is received and the initial TO at which the uplink or the downlink is to be transmitted or received.

For example, the operation of the UE (100 or 200 in FIG. 11) in step S105 described above to transmit capability information to the network may be implemented by the device in FIG. 11 below. For example, referring to FIG. 11, one or more processors 102 may control one or more transceivers 106 and/or one or more memories 104 to transmit capability information, and one or more transceivers 106 may transmit capability information to the network.

The UE may receive configuration information or/and control information from the network side through/using TRP 1 and/or TRP 2 (S105).

For example, the configuration information may include information related to network-side configuration (i.e., TRP configuration), resource allocation information related to M-TRP-based transmission and reception, etc. The configuration information may be transmitted through a higher layer (e.g., RRC, MAC CE). The configuration information may include information related to uplink transmission based on a configured grant (CG). Additionally, if the configuration information is defined or configured in advance, the corresponding step may be omitted.

For example, as in the above-described embodiment, the configuration information/control information may include second information related to at least one TO based on capability information. For example, the second information may include information for configuring/indicating one or more gap symbols between at least one TO, but is not limited to this. The second information may not include information configuring/indicating a gap symbol.

For example, the operation of the UE (100 or 200 in FIG. 11) in step S110 described above receiving the configuration information/control information from the network side (200 or 100 in FIG. 11) may be implemented by the device in FIG. 11, which will be described below. For example, referring to FIG. 11, one or more processors 102 may control one or more transceivers 106 and/or one or more memories 104, etc. to receive the setting information/control information, and one or more transceivers 106 may receive the configuration information/control information from the network side.

The UE may transmit uplink or receive downlink to the network (S115). Specifically, the UE may perform uplink transmission or downlink reception in at least one TO, based on at least the second information.

For example, the operation of the UE in step S115 (100 or 200 in FIG. 11) described above transmitting uplink to the network side (200 or 100 in FIG. 11) or receiving downlink from the network side (200 or 100 in FIG. 11) can be implemented by the device of FIG. 11, which will be described below.

Figure 11:
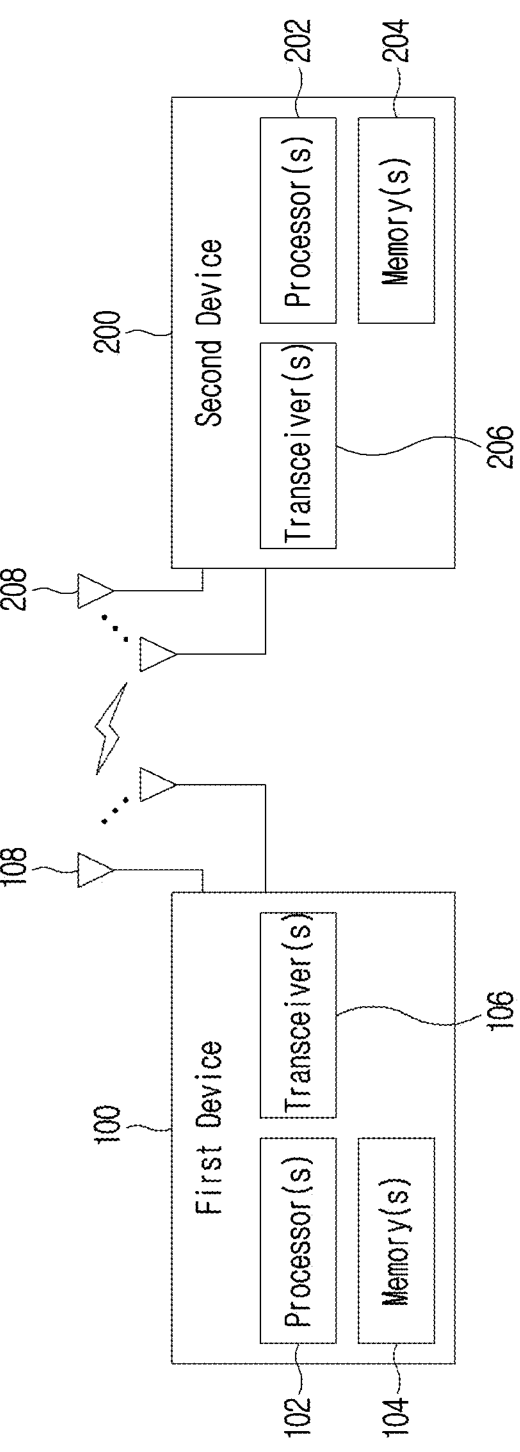
FIG. 11 illustrates a block diagram of a wireless communication device according to an embodiment of the present disclosure.

For example, referring to FIG. 11, one or more processors 102 may control one or more transceivers 106 and/or one or more memories 104, etc. to transmit uplink or receive downlink, and one or more transceivers 106 may transmit uplink or receive downlink to the network side.

General Device to which the Present Disclosure May be Applied

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

transmitting, by a user equipment (UE) to a base station, capability information including first information related to whether the UE supports an activation of only a single panel among a plurality of panels in a single time unit or activation of the plurality of panels in a single time unit;

receiving, by the UE from the base station, second information related to at least one transmission occasion (TO) based on the capability information; and based on the second information, performing, by the UE, uplink transmission or downlink reception in the at least one TO, wherein the capability information includes information on a time it takes to activate a single panel, and a minimum time offset between a time when downlink control information (DCI) including the second information is received and an initial TO at which the uplink transmission or the downlink reception is performed, and wherein based on the UE supporting an activation of the plurality of panels in a single time unit and only a first panel of the plurality of panels being activated:

i) a first time offset between a time when the DCI including the second information is received and a time when the downlink reception scheduled by the DCI is performed and ii) a second time offset between a time when the downlink reception is performed and a TO at which an uplink transmission related to the downlink reception is first performed are received from the base station, and a sum of the first time offset and the second time offset has a value equal to or greater than at least one of the time it takes to activate the single panel or the minimum time offset.

2. The method of claim 1, wherein:

the capability information includes information on at least one activated panel among the plurality of panels.

3. The method of claim 1, wherein:

based on the UE supporting an activation of only a single panel among the plurality of panels in a single time unit, the second information includes information for configuring a gap symbol between a first TO among the at least one TO and a second TO adjacent to the first TO, the first TO is a TO in which the uplink transmission or the downlink reception is performed by an activated first panel among the plurality of panels, and the second TO is a TO in which the uplink transmission or the downlink reception is performed by an activated second panel among the plurality of panels.

4. The method of claim 1, wherein:

based on the UE supporting an activation of the plurality of panels in a unit of time and all of the plurality of panels being activated, the uplink transmission or the downlink reception is performed in the at least one TO to which a gap symbol is not applied.

5. The method of claim 2, wherein:

the uplink transmission includes at least one of transmission of a physical uplink shared channel (PUSCH) or a physical uplink control channel (PUCCH) including an acknowledgment (ACK)/negative acknowledgment (NACK) for a physical downlink shared channel (PDSCH), and the downlink reception includes reception of the PDSCH.

6. The method of claim 1, wherein:

based on the UE supporting an activation of the plurality of panels in a single time unit and only a first panel of the plurality of panels being activated, during the sum of the first time offset and the second time offset after the DCI is received, the plurality of panels are all activated by the UE.

7. The method of claim 1, wherein:

the at least one TO includes a first TO and a second TO adjacent to the first TO, and based on the uplink transmission or the downlink reception being performed through a first panel or a first beam in the first TO and the uplink transmission or the downlink reception being performed through a second panel or a second beam in the second TO, the second information includes information for configuring a gap symbol between the first TO and the second TO.

8. A user equipment (UE) comprising:

at least one transceiver; and at least one processor connected to the at least one transceiver, wherein the at least one processor is configured to:

transmit, to a base station through the at least one transceiver, capability information including first information related to whether the UE supports an activation of only a single panel among a plurality of panels in a single time unit or activation of the plurality of panels in a single time unit;

receive, from the base station through the at least one transceiver, second information related to at least one transmission occasion (TO) based on the capability information; and based on the second information, perform uplink transmission or downlink reception in the at least one TO, wherein the capability information includes information on a time it takes to activate a single panel, and a minimum time offset between a time when downlink control information (DCI) including the second information is received and an initial TO at which the uplink transmission or the downlink reception is performed, and wherein based on the UE supporting an activation of the plurality of panels in a single time unit and only a first panel of the plurality of panels being activated:

i) a first time offset between a time when the DCI including the second information is received and a time when the downlink reception scheduled by the DCI is performed and ii) a second time offset between a time when the downlink reception is performed and a TO at which the uplink transmission related to the downlink reception is first performed are received from the base station, and a sum of the first time offset and the second time offset has a value equal to or greater than at least one of the time it takes to activate the single panel or the minimum time offset.

9. A base station comprising:

at least one transceiver; and at least one processor connected to the at least one transceiver, wherein the at least one processor is configured to:

receive, from a user equipment (UE) through the at least one transceiver, capability information including first information related to whether the UE supports an activation of only a single panel among a plurality of panels in a single time unit or activation of the plurality of panels in a single time unit;

transmit, to the UE through the at least one transceiver, second information related to at least one transmission occasion (TO) based on the capability information; and based on the second information, perform uplink reception or downlink transmission in the at least one TO, wherein the capability information includes information on a time it takes to activate a single panel, and a minimum time offset between a time when downlink control information (DCI) including the second information is transmitted and an initial TO at which the uplink reception or the downlink transmission is performed, and wherein based on the UE supporting an activation of the plurality of panels in a single time unit and only a first panel of the plurality of panels being activated:

i) a first time offset between a time when the DCI including the second information is transmitted and a time when the downlink transmission scheduled by the DCI is performed and ii) a second time offset between a time when the downlink transmission is performed and a TO at which the uplink reception related to the downlink transmission is first performed are transmitted to the UE, and a sum of the first time offset and the second time offset has a value equal to or greater than at least one of the time it takes to activate the single panel or the minimum time offset.

* * * * *